US012630483B2

(12) United States Patent
Liu et al.

(10) Patent No.: US 12,630,483 B2
(45) Date of Patent: May 19, 2026

(54) METHOD FOR CONVERTING BIODEGRADABLE POLYMERS INTO HUMUS WITH A LOW RELEASE AMOUNT OF CO₂ AND USE THEREOF

(71) Applicant: North University of China, Taiyuan (CN)

(72) Inventors: Yaqing Liu, Taiyuan (CN); Taian Chen, Taiyuan (CN); Yunhui Guo, Taiyuan (CN); Guizhe Zhao, Taiyuan (CN); Yang Xiang, Taiyuan (CN)

(73) Assignee: University of China, Taiyuan (CN)

( * ) Notice: Subject to any disclaimer, the term of this patent is extended or adjusted under 35 U.S.C. 154(b) by 832 days.

(21) Appl. No.: 17/564,008

(22) Filed: Dec. 28, 2021

(65) Prior Publication Data

US 2022/0388923 A1 Dec. 8, 2022

(30) Foreign Application Priority Data

Jun. 8, 2021 (CN) .......................... 202110639518.X

(51) Int. Cl.
  *C05F 11/00* (2006.01)
  *B09B 3/00* (2022.01)
  *C05C 9/02* (2006.01)
(52) U.S. Cl.
  CPC ............... *C05F 11/00* (2013.01); *B09B 3/00* (2013.01); *C05C 9/02* (2013.01)
(58) Field of Classification Search
  CPC .... C05C 9/02; C05C 3/00; C05C 9/00; C05G 5/40; C05G 5/12; C05F 17/00
  See application file for complete search history.

(56) References Cited

U.S. PATENT DOCUMENTS 11,040,920 B2 * 6/2021 Shirley, Jr. ............... C05C 11/00
2019/0218152 A1 * 7/2019 Zhao ........................ C05B 19/00

FOREIGN PATENT DOCUMENTS

CN 105360177 A * 3/2016 ............. A01N 25/10

OTHER PUBLICATIONS

"Compost Chemistry." p. 1. Cornell, Feb. 22, 2004 (Year: 2004).*
Zhao et al. "Roles of nitrogen, phosphorus, and potassium fertilizers in carbon sequestration in a Chinese algricultural ecosystem." pp. 589-591. Springer, Apr. 29, 2017 (Year: 2017).*
"Urea Formaldehyde." Byrne et al., California Agriculture, Mar. 1961 (Year: 1961).*

(Continued)

*Primary Examiner* — Amber R Orlando
*Assistant Examiner* — Heather Elise Silva Rainbow

(57) ABSTRACT

The present disclosure relates to biodegradable polymers, particularly to a method for converting biodegradable polymers into humus with a low release amount of CO₂ and use thereof. A composite material system is formed from the biodegradable polymers and the materials that can slowly release nutrient nitrogen or nutrients nitrogen and phosphorus, in which the mass ratio of carbon to nitrogen in the composite material system is (1-35):1. The materials of the present disclosure can promote the biodegradable polymers to be converted into soil humus or compost humus, rather than to be converted into greenhouse gas CO₂, which is to be emitted into the atmosphere.

6 Claims, 5 Drawing Sheets

(56)　　　　　References Cited

OTHER PUBLICATIONS

"Pulverization 1: Definition and purpose." p. 2. Thinky, Oct. 31, 2019 (Year: 2019).*

"Comparison of Sampling Methods Used to Evaluate Forest Soil Bulk Density." Solgi et al., Croatian Journal of Forest Engineering, May 2018 (Year: 2018).*

Espacenet Translation of Lie CN-105360177-A.*

Zhang et al. "Biodegradable Urea—Formaldehyde/PBs and Its Ternary Nanocomposite." pp. 4595-4601. Journal of Agriculture and Food Chemistry, Mar. 26, 2020 (Year: 2020).*

Espacenet Translation of Lie CN 105360177 A (Year: 2016).*

* cited by examiner

METHOD FOR CONVERTING BIODEGRADABLE POLYMERS INTO HUMUS WITH A LOW RELEASE AMOUNT OF CO₂ AND USE THEREOF

TECHNICAL FIELD

The present invention relates to biodegradable polymers, particularly to a method for converting biodegradable polymers into humus with a low release amount of $CO_2$ and use thereof.

BACKGROUND ART

Humus is a kind of mixture of macromolecular organic compounds ubiquitous in the natural environment. It is a colloidal substance formed by microbial decomposition and conversion of organic substances. Based on the solubility of humus in acid and alkali solutions, it can be divided into three categories: (1) fulvic acid (FA), which is soluble in both acid and alkali; (2) humic acid (HA), which is soluble in alkali but insoluble in acid; (3) humin (HM), which is insoluble in both acid and alkali. Humus is the central part of soil organic substance and is a kind of peculiar substance of soil. The change in its composition and structure directly affects the property and fertility of the soil. Humus contains various nutrients required for crop growth. As the humus is decomposed, the nutrients can be released continuously for use by crops and microorganisms. At the same time, the humus releases the energy required for microbial life activities. Therefore, humus is closely related to crop yield. In addition, humus, as the main component of soil, is also a critical carbon pool that affects the global carbon balance.

According to the definition by the American Society for Testing and Materials (ASTM), biodegradable polymers can be hydrolyzed or degraded by the enzymes or microorganisms in the presence of water so that the backbones of the polymers break, and their relative molecular weight is gradually reduced, thereby finally metabolizing into the monomers and $CO_2$ and water. Obviously, when reducing $CO_2$ emissions has become the most urgent task to save the earth and human beings, reducing the release amount of $CO_2$ during the biodegradation of polymers is of great significance.

In the field of pedology, it is generally believed that some of the various organic substances entering the soil will be converted into the soil humus, and different exogenous organic substances will have different effects on the content, composition and properties of the soil humus, which will lead to different effects on the soil chemical properties as well as the composition and stability of aggregate. On the one hand, biodegradable polymers cause no pollution and can slowly release the elements contained therein, so more and more agricultural biodegradable polymers have been developed. On the other hand, landfill is still the most commonly used method for treating polymers, including biodegradable polymers, at home and abroad, so a large number of biodegradable polymers discarded after completion of use function will inevitably enter the soil. Therefore, converting more biodegradable polymers into humus rather than releasing them in the form of $CO_2$ is extremely important.

Composting is a biochemical process with crop straw, weeds, leaves, peat, organic household waste, kitchen waste, sludge, human and animal manure, distiller's grains, fungus chaff and other organic wastes as the main raw materials and utilizing microorganisms widely existing in the nature to control the degradable organic substance in the solid wastes to be converted into stable humus, which is a process for producing organic fertilizer. The organic fertilizers formed by composting or decomposition are rich in nutrients, which have long and stable fertilizer efficiency and can also promote the formation of soil solid grain structure and improve water retention, heat retention, ventilation, and fertilizer retention capabilities of the soil. It is also of great significance to convert more biodegradable polymers into humus rather than release them in the form of $CO_2$ during composting.

DESCRIPTION OF THE INVENTION

In view of the above background, the present invention aims to provide a method for converting biodegradable polymers into humus with a low release amount of $CO_2$ and use thereof. The present invention can promote the biodegradable polymers to be converted into humus, thereby reducing the release amount of $CO_2$ during the degradation process of the biodegradable polymers so that more biodegradable polymers entering the soil or serving as raw composting materials are converted into humus rather than being converted into greenhouse gas $CO_2$ which is to be emitted into the atmosphere. The present invention is realized by the following technical solutions: a method for converting biodegradable polymers into humus with a low release amount of $CO_2$, wherein a composite material system is formed from the biodegradable polymers and materials that slowly release nutrient nitrogen or nutrients nitrogen and phosphorus, in which the mass ratio of carbon to nitrogen systems is (1-35):1.

As further improvements of the technical solutions of the present invention, in the composite material system, the biodegradable polymers and the materials that slowly release nutrient nitrogen or nutrients nitrogen and phosphorus are compounded by physically blending or by hydrogen bonds interaction among functional groups of each of components of the composite material system.

As further improvements of the technical solutions of the present invention, the biodegradable polymers are selected from one or a compound of more than one of natural biodegradable polymers and synthetic biodegradable polymers.

As further improvements of the technical solutions of the present invention, the natural biodegradable polymers are selected from one or a compound of more than one of starch, cellulose, sodium alginate and chitosan, and the synthetic biodegradable polymers are selected from one or a compound of more than one of polyvinyl alcohol (PVA), polylactic acid (PLA), polybutylene succinate (PBS) and poly (butylene adipate-co-terephthalate) (PBAT).

As further improvements of the technical solutions of the present invention, the materials that slowly release nutrient nitrogen or nutrients nitrogen and phosphorus are selected from one or a compound of more than one of slow-release fertilizer, controlled-release fertilizer, polyurea, polyacrylamide, polyaspartic acid, protein, melamine copolymer resin and phosphates polymer.

As further improvements of the technical solutions of the present invention, the slow-release fertilizer comprises ureaformaldehyde or derivatives thereof.

The present invention also provides a preparation method of the urea-formaldehyde, comprising the steps of adding calculated amounts of formaldehyde and urea into a reactor respectively to obtain a reaction system, adjusting the pH value of the reaction system, and reacting the same at a set temperature; and then adjusting the temperature of the reactor and the pH of the reaction system in the reactor to continue the reaction until the system is viscous. The viscous product obtained is dried at a set temperature and then pulverized to obtain a urea-formaldehyde powder.

The present invention additionally provides a preparation method of derivatives of the urea-formaldehyde, comprising the steps of adding calculated amounts of formaldehyde and urea into a reactor respectively to obtain a reaction system, adjusting the pH value of the reaction system, and reacting the same at a set temperature; then adjusting the temperature of the reactor, and after raising it to the set temperature, adding a calculated amount of phosphate to continue the reaction until the system is viscous. The viscous product obtained is dried at a set temperature and then pulverized to obtain a powder of derivatives of urea-formaldehyde. The phosphates are selected from one or a compound of more than one of hydroxyapatite, ammonium dihydrogen phosphate, calcium superphosphate and potassium dihydrogen phosphate.

As further improvements of the technical solutions of the present invention, the step of physically blending the biodegradable polymers and the materials that slowly release nutrient nitrogen or nutrients nitrogen and phosphorus comprises the steps of uniformly mixing the biodegradable polymers with the materials that slowly release nutrient nitrogen or nutrients nitrogen and phosphorus, and then extruding the uniformly mixed material system by an extruder and pelleting the same to obtain the composite material system.

As further improvements of the technical solutions of the present invention, the step of compounding the biodegradable polymers and urea-formaldehyde by hydrogen bonds interaction among functional groups of each of components of the composite material system comprises the steps of:

(1) preparation of a methylolurea powder: adding calculated amounts of formaldehyde and urea into a reactor respectively to obtain a reaction system, adjusting the pH of the reaction system, and reacting the same at a set temperature followed by pouring the reaction solution into a beaker and sealing it, freezing it in a refrigerator, and then extracting and filtering out the remaining liquid to obtain a sample, and finally drying the sample in a vacuum oven and then pulverizing it to obtain a methylolurea powder; and (2) uniformly mixing the biodegradable polymers with the methylolurea powder, which is a precursor of urea-formaldehyde, prepared in step (1), then extruding the uniformly mixed material system by an extruder and pelleting the same, and subjecting the added methylolurea powder, which is a reaction precursor of urea-formaldehyde, to melt polycondensation reaction in a barrel of the extruder to obtain the composite material systems formed from the biodegradable polymers and urea-formaldehyde by the hydrogen bonds interaction among functional groups of each of components of the composite material system.

The step of compounding the biodegradable polymers and derivatives of urea-formaldehyde by hydrogen bonds interaction among functional groups of each of components of the composite material system comprises the steps of:

(I) preparation of a methylolurea powder: adding calculated amounts of formaldehyde and urea into a reactor respectively to obtain a reaction system, adjusting the pH of the reaction system, and reacting the same at a set temperature followed by pouring the reaction solution into a beaker and sealing it, freezing it in a refrigerator, and then extracting and filtering out the remaining liquid, and finally drying the sample in a vacuum oven and then pulverizing it to obtain the methylolurea powder; and (II) uniformly mixing the biodegradable polymers with the methylolurea powder, which is a precursor of urea-formaldehyde, prepared in step (I) and phosphate, then extruding the uniformly mixed material system by an extruder and pelleting the same, and subjecting the added methylolurea, which is a reaction precursor of urea-formaldehyde, to melt polycondensation reaction in a barrel of the extruder to obtain the composite material systems formed from the biodegradable polymers and derivatives of urea-formaldehyde by the hydrogen bonds interaction among functional groups of each of components of the composite material system.

The present invention further provides the use of the method for converting biodegradable polymers into humus with a low release amount of $CO_2$ in promoting the biodegradable polymers to be converted into soil humus or compost humus.

As further improvements of the use technical solutions of the present invention, the composite material system formed from the biodegradable polymers and the materials that slowly release nutrient nitrogen or nutrients nitrogen and phosphorus is added into the soil or the raw composting material in a mass ratio of its carbon content to the soil or the compost quality of 1:(60-10900). In a specific implementation, the person skilled in the art can also process the composite material systems formed from the biodegradable polymers and the materials that slowly release nutrient nitrogen or nutrients nitrogen and phosphorus by simply physically blending or by the hydrogen bonds interaction among functional groups of each of components of the composite material system into products of various shapes, including particles, sheets, membrane materials, pipes, etc., by processes such as suction moulding, injection moulding, blow moulding, film blowing, casting, and spinning according to different requirements.

The technical solutions of the present invention have the advantages that the method of the present invention can promote the biodegradable polymers to be converted into soil humus or compost humus, rather than to be converted into greenhouse gas $CO_2$, which is to be emitted into the atmosphere. Therefore, the method is significant for energy conservation and emission reduction, green and efficient utilization of biodegradable polymers and efficient and green utilization of biodegradable polymers wastes.

BRIEF DESCRIPTION OF THE DRAWINGS

In order to explain the embodiments of the present invention or the technical solutions in the prior art more clearly, the drawings required for the description of the embodiments of the present invention or prior art will be briefly described below. Obviously, the drawings in the following description are only some embodiments of the present invention. For those of ordinary skill in the art, other drawings can be obtained in accordance with these drawings without any creative work.

FIGS. 6A and 6B show that in the process of soil culture and composting, the FA contents of those treated with the composite material systems formed from biodegradable polymers and materials that slowly release nutrient nitrogen all show a trend of increasing first and then stabilizing (or slightly decreasing), and the increasing of the FA contents for the [PVA/UF] system is the most significant. Compared with the soil treated with PVA, the soils treated with [PVA+UF]$_{C:N=5:1}$, [PVA/UF]$_{C:N=5:1}$ and [PVA/UF]$_{C:N=15:1}$ have the FA contents thereof increased by 3.08-13.19%, 5.06-21.96% and 9.78-26.43% respectively; while the composts with [PVA+UF]$_{C:N=5:1}$, [PVA/UF]$_{C:N=5:1}$ and [PVA/UF]$_{C:N=15:1}$ as raw materials have the FA contents thereof increased by 5.72-7.02%, 11.12-13.42% and 15.63-17.98% respectively compared with the compost treated with PVA. It can be seen from FIG. 6C that in the pot experiment, compared with the soil treated with PBS, the soils treated with [PBS/UF]$_{C:N=36:1}$ and [PBS/UF]$_{C:N=5.37:1}$ have the FA contents thereof increased by 4.06-24.51% and 5.08-17.22% respectively.

FIGS. 7A and 7B show that in the soil culture and composting, the HA contents of those treated with the composite material systems formed from biodegradable polymers and materials that slowly release nutrient nitrogen all show a trend of increasing, and the increasing of the HA contents for the [PVA/UF] system is the most significant. Compared with the soil treated with PVA, the soils treated with [PVA+UF]$_{C:N=5:1}$, [PVA/UF]$_{C:N=5:1}$ and [PVA/UF]$_{C:N=15:1}$ have the HA contents thereof increased by 2.90-24.60%, 5.06-35.96% and 9.78-38.62% respectively, and the composts with [PVA+UF]$_{C:N=5:1}$, [PVA/UF]$_{C:N=5:1}$ and [PVA/UF]$_{C:N=15:1}$ as raw materials have the HA contents thereof increased by 10.25-13.27%, 21.95-24.44% and 40.80-43.26% respectively. It can be seen from FIG. 7C that in the pot experiment, compared with the soil treated with PBS, the soils treated with [PBS/UF]$_{C:N=1.36:1}$ and [PBS/UF]$_{C:N=5.37:1}$ have the HA contents thereof increased by 28.73-37.80% and 12.17-26.65%, respectively.

FIGS. 8A and 8B show that, compared with the soil treated with PVA, the soils treated with [PVA+UF]$_{C:N=5:1}$, [PVA/UF]$_{C:N=5:1}$ and [PVA/UF]$_{C:N=15:1}$ have the PQ values thereof increased by 1.67-6.21%, 0-11.07% and 7.38-9.84% respectively, and the composts with [PVA+UF]$_{C:N=5:1}$, [PVA/UF]$_{C:N=5:1}$ and [PVA/UF]$_{C:N=15:1}$ as raw materials have the PQ values thereof increased by 3.59-6.08%, 7.52-11.98% and 20.9-23.90% respectively. It can be seen from FIG. 8C that in the pot experiment, compared with the soil treated with PBS, the soils treated with [PBS/UF]$_{C:N=1.36:1}$ and [PBS/UF]$_{C:N=5.37:1}$ have the PQ values thereof increased by 10.68-23.70% and 5.71-13.45% respectively.

Figure 1:
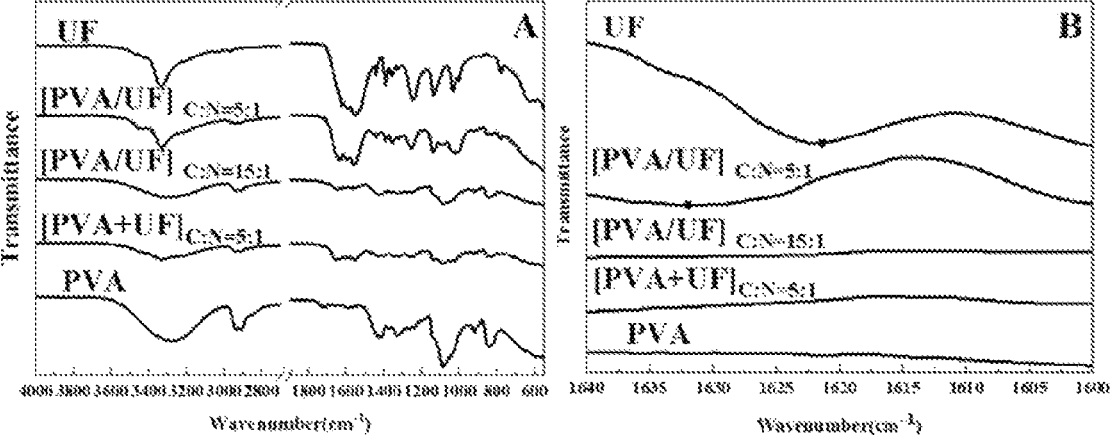
FIG. 1 shows the FTIR spectra of UF, PVA, [PVA+UF]$_{C:N=5:1}$, [PVA/UF]$_{C:N=5:1}$ and [PVA/UF]$_{C:N=15:1}$. It can be seen that the addition of UF leads to the decrease in the intensity of peaks corresponding to PVA functional groups, and the higher the addition amount of UF is, the lower the peak intensity is. In the figure, the absorption peak of carbonyl stretching vibration (amide I band) of the UF molecule is at 1622 cm$^{-1}$. It can be found that compared with the spectra of UF, the peak wavenumber of amide I band in [PVA/UF] system has a certain degree of blue shift, which indicates that UF produced in situ in extruder from MU forms a strong hydrogen bonding with PVA macromolecular chain. However, there is no shift of the stretching vibration peak of the amide I band in [PVA+UF] system, which indicates that there is no obvious interaction between PVA molecular chains and UF molecular chains. FTIR spectra show that the products have the structures.
Figure 2:
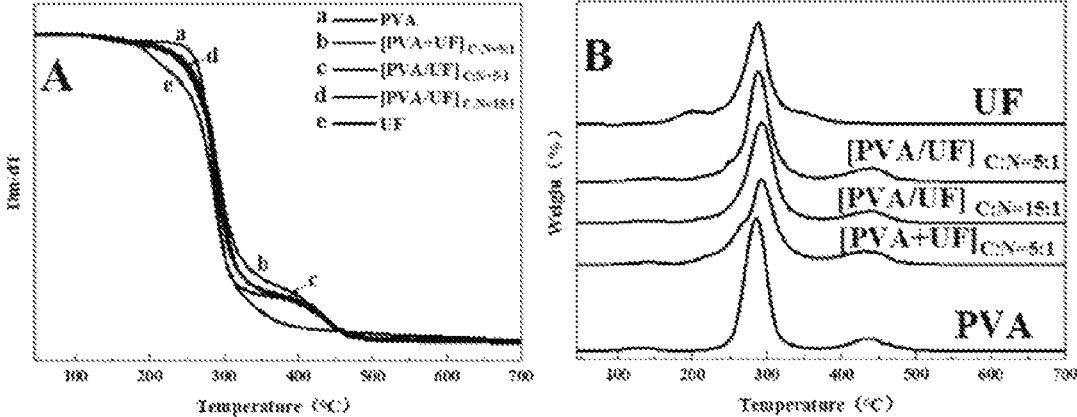
FIG. 2 shows the TG and DTG spectra of UF, PVA, [PVA+UF]$_{C:N=5:1}$, [PVA/UF]$_{C:N=5:1}$ and [PVA/UF]$_{C:N=15:1}$. It can be seen that the thermal decomposition temperature (T$_{5\%}$) of [PVA/UF]$_{C:N=5:1}$ is slightly lower than that of [PVA+UF]$_{C:N=5:1}$, which indicates that in the PVA/UF system, since PVA and UF form a molecular-scale mixing, the respective intermolecular hydrogen bonds of each of the two components are obviously broken, thereby leading to a more decrease in the thermal decomposition temperature (T$_{5\%}$) of the composite material system. Compared with [PVA/UF]$_{C:N=15:1}$, the thermal decomposition temperature (T$_{5\%}$) of [PVA/UF]$_{C:N=5:1}$ decreases more, which indicates that the higher the addition amount of the UF is, the more pronounced the intermolecular hydrogen bonds of PVA component in the system are broken, and the worse the thermal stability of the composite system is. TG and DTG spectra show that the products have the structures.
Figure 3:
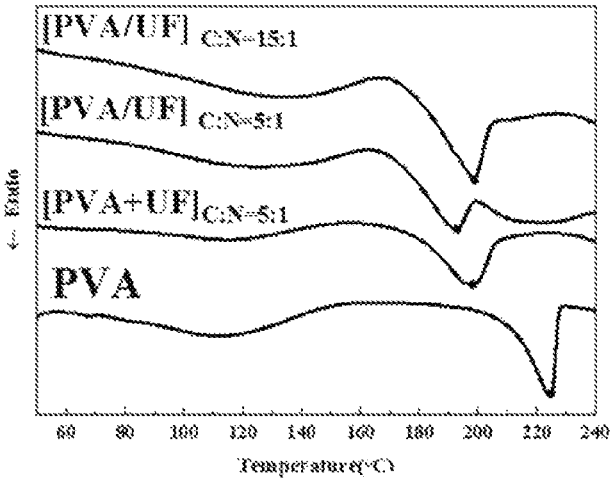
FIG. 3 shows the DSC spectra of PVA, [PVA+UF]$_{C:N=5:1}$, [PVA/UF]$_{C:N=5:1}$ and [PVA/UF]$_{C:N=15:1}$. It can be seen that, compared with pure PVA, both the addition of UF in the [PVA+UF] system and the addition of UF in the [PVA/UF] system reduce the melting temperature of PVA, which indicates that the introduction of UF component destroys the original strong hydrogen bonds among PVA molecular chains, and further reduces the crystallinity of PVA component, thereby ultimately leading to the decrease of melting temperature of PVA. Compared with the [PVA+UF] system, the [PVA/UF] system has the melting temperature of its component PVA reduced more significantly, which indicates that in the physical mixing system [PVA+UF], a hydrogen bonding is formed between only the molecular chains on the particle surface of each of components. In contrast, in the chemical bonding system [PVA/UF], since UF and PVA are mixed in molecular scale, more UF molecular chains penetrate into the crystalline region of PVA and form hydrogen bonding with it, thereby leading to a more significant decrease in the crystallinity of PVA. DSC curves show that the products have the structures.
Figure 4:
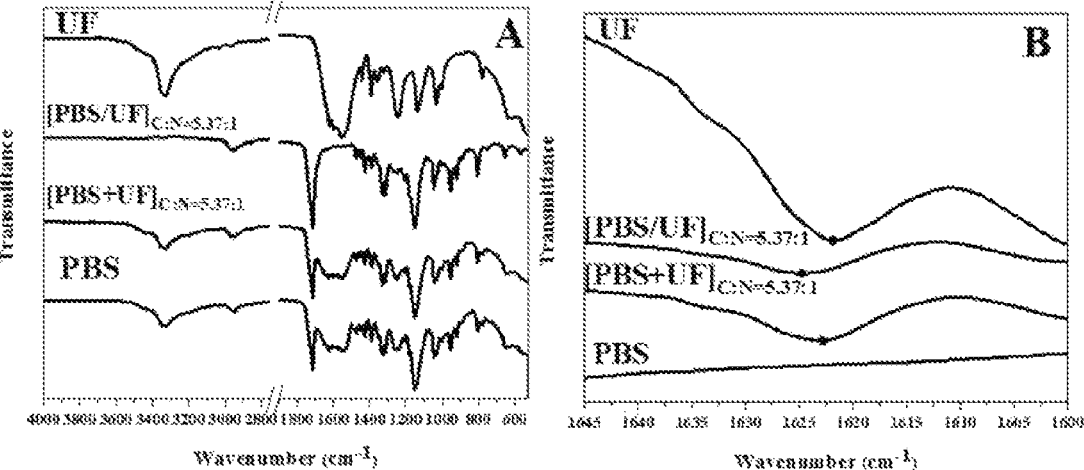
FIG. 4 shows the FTIR spectra of UF, PBS, [PBS+UF]$_{C:N=5.37:1}$ and [PBS/UF]$_{C:N=5.37:1}$. It can be seen that compared with [PBS/UF]$_{C:N=5.37:1}$, the peak of [PBS+UF]$_{C:N=5.37:1}$ obtained by direct extrusion of PBS and UF has a much smaller degree of a blue shift than that of UF at 1622 cm$^{-1}$, indicating that the PBS component in this system has no obvious interaction with UF molecular chain. The FTIR spectra show that the products have the structures.
Figure 5:
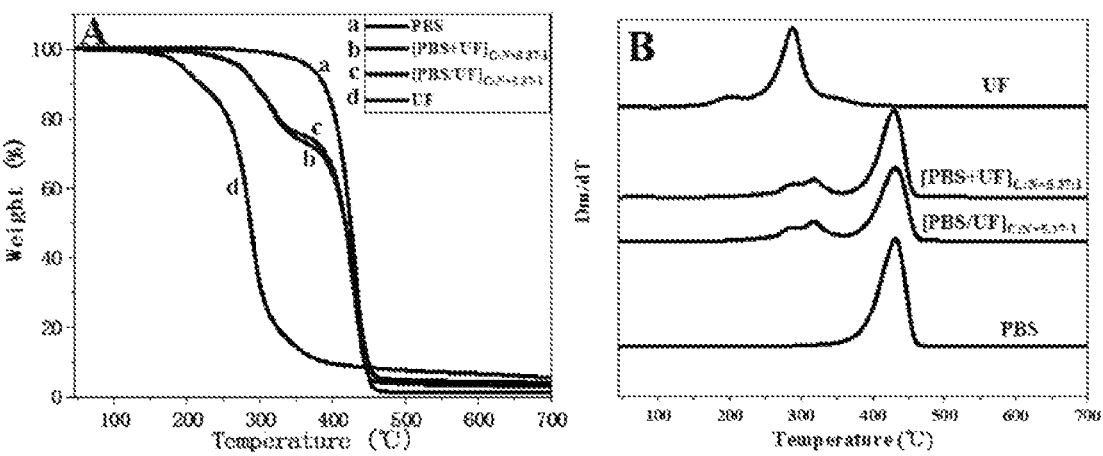
FIG. 5 shows the TG and DTG spectra of UF, PBS, [PBS+UF]$_{C:N=5.37:1}$ and [PBS/UF]$_{C:N=5.37:1}$. It can be seen that the decomposition temperature (T$_{5\%}$) of [PBS/UF]$_{C:N=5.37:1}$ is slightly lower than that of [PBS+UF]$_{C:N=5.37:1}$. The reason is that compared with the simple physical mixing system, [PBS/UF] obtained by reactive extrusion have the chain segments of its two components mixing in the scale of molecular segments, and more UF molecular chains penetrate into the crystalline region of PBS and form hydrogen bonding with it so that the respective intermolecular hydrogen bonds in each component of PBS and UF are broken more, so the thermal decomposition temperature (T$_{5\%}$) of [PBS/UF]$_{C:N=5.37:1}$ is lower. The TG and DTG spectra show that the products have the structures.
Figure 6:
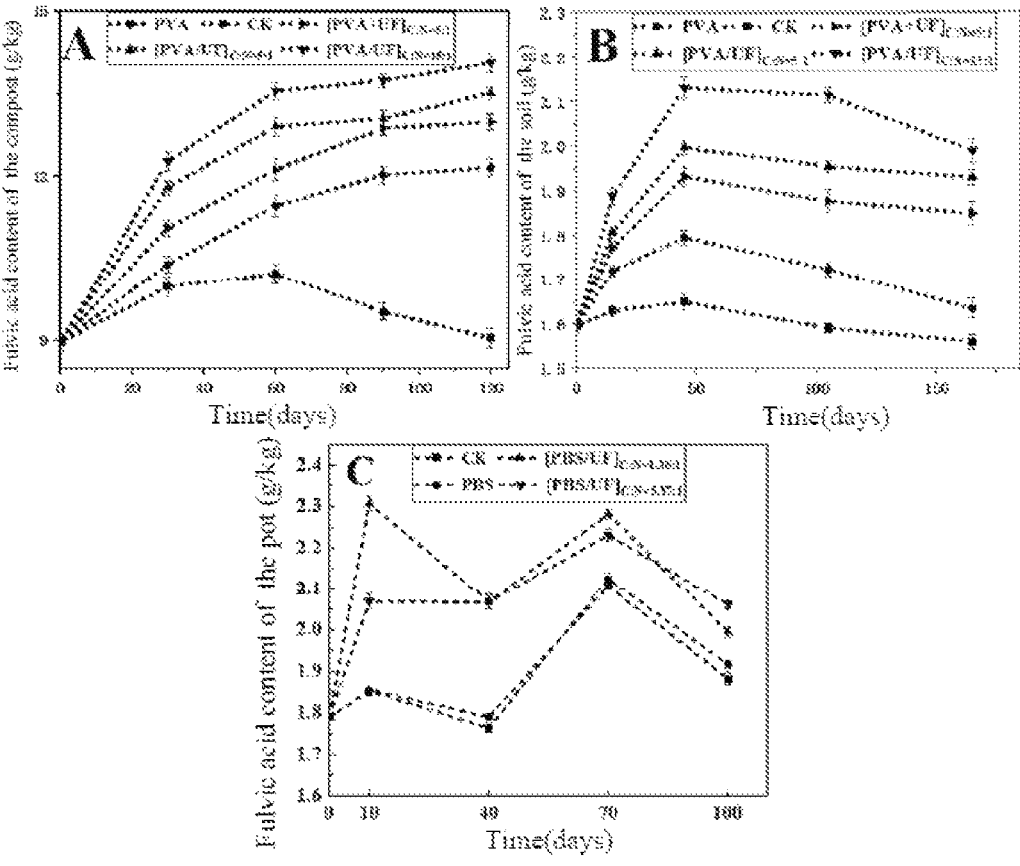
FIG. 6 shows the changes in fulvic acid (FA) contents in the soil or compost during soil culture, pot experiment or composting.
Figure 7:
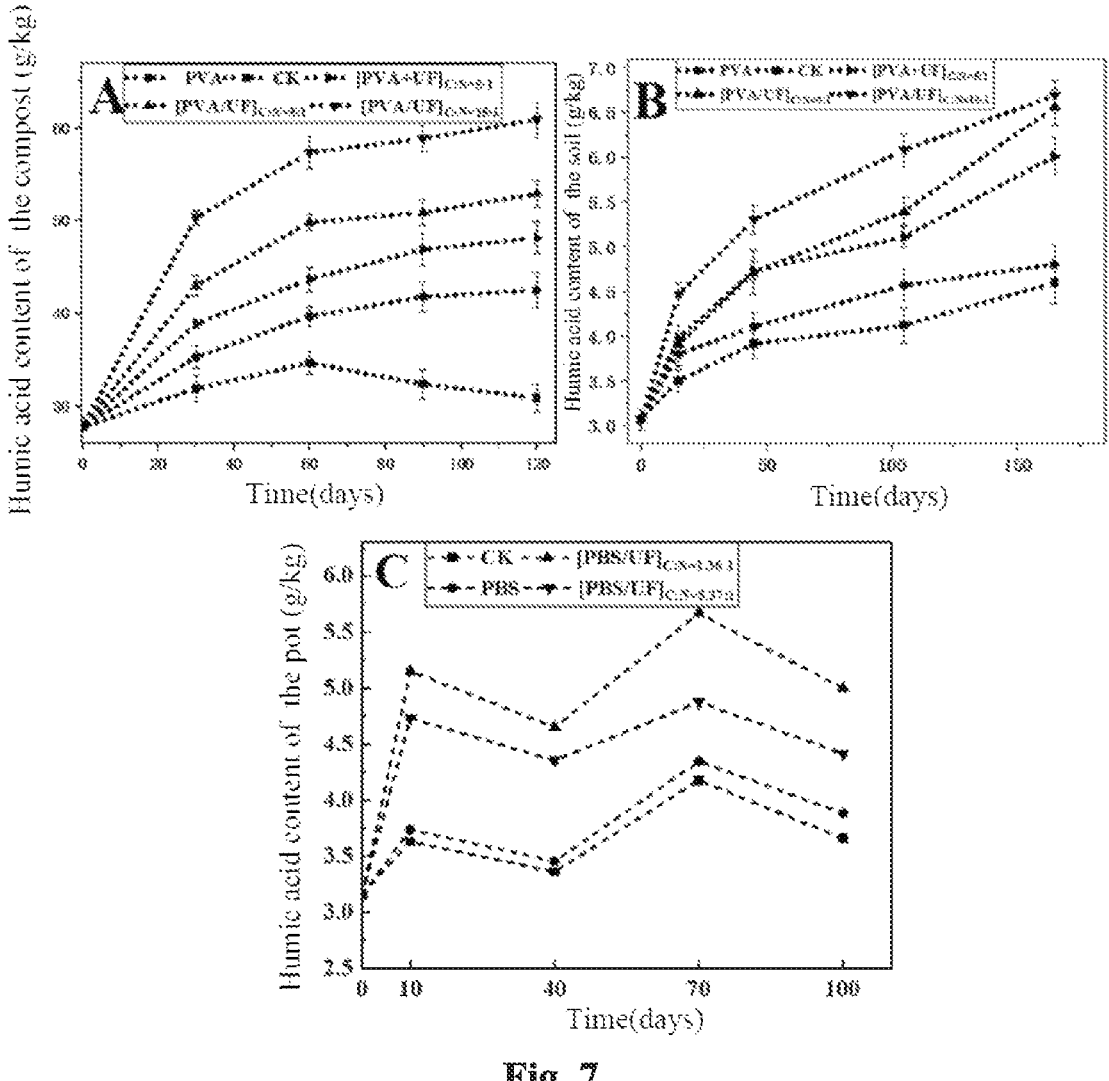
FIG. 7 shows the changes in humic acid (HA) contents in the soil or compost during soil culture, pot experiment or composting.
Figure 8:
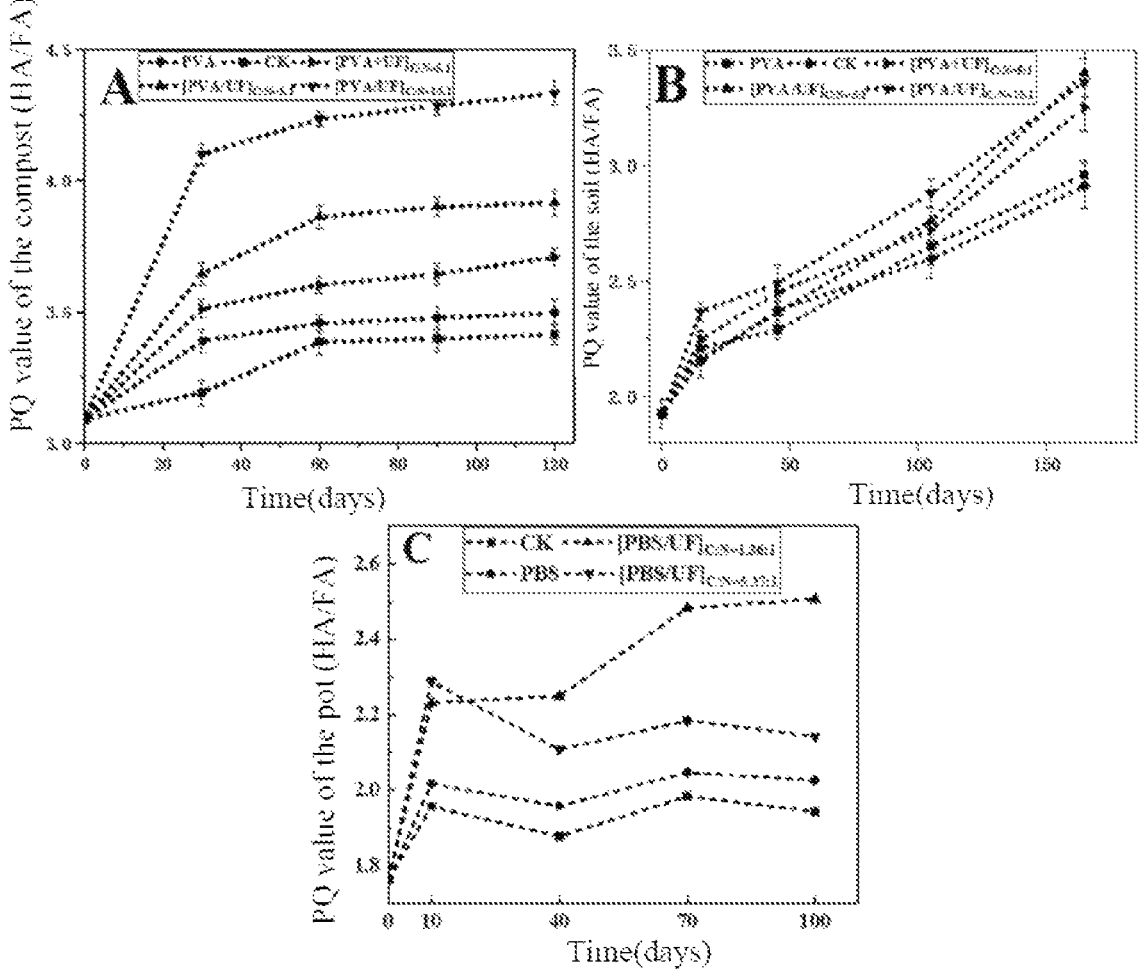
FIG. 8 shows the changes in the PQ=HA/FA values in the soil or compost during soil culture, pot experiment or composting. PQ=HA/FA can represent the degree of humification and the quality of humus to a certain extent. The higher the PQ value is, the better the quality of soil or compost is.

Note: CK is a blank control, UF is urea-formaldehyde, PVA is polyvinyl alcohol, PBS is polybutylene succinate, [PVA+UF] and [PBS+UF] are composite material systems formed by simply physical mixing two components, [PVA/UF] and [PBS/UF] are composite material systems formed by hydrogen bonds interaction between two components, and C:N in $[PVA+UF]_{C:N=m:n}$, $[PVA/UF]_{C:N=m:n}$, $[PBS+UF]_{C:N=m:n}$ and $[PBS/UF]_{C:N=m:n}$ is the mass ratio of carbon to nitrogen.

BEST MODE FOR CARRYING OUT THE INVENTION

In order to make the objectives, technical solutions and advantages of the present invention clearer, the technical solutions of the present invention will be described in detail below. Obviously, the described examples are only a part of the examples of the present invention, but not all of the examples. Based on the examples of the present invention, all the other embodiments obtained by those of ordinary skill in the art without creative efforts shall fall within the protection scope of the present invention.

The specific experimental arrangement and test method in the present invention:

Soil culture: the pure biodegradable polymer or composite material system of biodegradable polymer and materials that slowly release nutrient nitrogen or nutrients nitrogen and phosphorus was added into the soil in a mass ratio of its carbon content to the soil quality of 1:60, wherein most material (pure biodegradable polymer or composite material system) was directly and uniformly mixed with soil in proportion, and rest material (pure biodegradable polymer or composite material system) was put into nylon mesh bags and then buried in the soil, and the soil without added material was used as a blank control (CK). The humidity of these soils was kept at 40%, and these soils were sealed and cultivated in the dark in an incubator at 25° C. The materials in the mesh bags and soil samples were taken out on the 15th, 45th, 105th and 165th days. The materials were taken out of the mesh bags, carefully separated from the adhered soil, ultrasonically cleaned with anhydrous ethanol to remove impurities adhered to the surface of the materials, dried, weighed and further analyzed; and fulvic acid and humic acid in the soil samples (soils with or without added materials) were extracted and tested.

Compost culture: the pure biodegradable polymer or composite material system of biodegradable polymer and materials that slowly release nutrient nitrogen or nutrients nitrogen and phosphorus was added into a raw composting material (composed of cow dung and corn straw in a mass ratio of 1:4) in a mass ratio of its carbon content to the composting quality of 1:60, wherein most of the material (pure biodegradable polymer or composite material system) was directly and uniformly mixed with the raw composting material in proportion, and rest of the material (pure biodegradable polymer or composite material system) was put into nylon mesh bags and then buried in the compost, and the compost without added material was used as a blank control (CK). The humidity of these systems was kept at 40%, and the systems were sealed and cultivated in the dark in an incubator at a constant temperature of 58° C., and the materials and composts were taken out on the 30th, 60th, 90th and 120th day. The materials were taken out of the mesh bags, ultrasonically cleaned with anhydrous ethanol to remove impurities adhered to its surface, dried, weighed and further analyzed; and fulvic acid and humic acid in the composts (composts with or without added materials) were extracted and tested.

Pot experiment: the pure biodegradable polymer or composite material system of biodegradable polymer and materials that slowly release nutrient nitrogen or nutrients nitrogen and phosphorus was applied to the soil in pots in a mass ratio of its carbon content to the soil quality of 1:10900, wherein most of the material (pure biodegradable polymer or composite material system) was directly and uniformly mixed with soil, and rest of the material (pure biodegradable polymer or composite material system) was put into nylon mesh bags and then buried in the soil. After the surface soils were paved, the pots were watered with tap water, and then tomato seedlings were transplanted therein. On the 10th day (seedling period), 40th day (flowering period), 70th day (fruiting period) and 100th day (mature period), the materials were taken out of the mesh bags, carefully separated from the adhered soil, ultrasonically cleaned with anhydrous ethanol to remove impurities adhered to the surface of the materials, dried, weighed and further analyzed. At the same time, the five-point sampling method was used to collect each of the treated soil samples, and fulvic acid and humic acid in the soil samples were extracted and tested.

The extraction method of fulvic acid and humic acid: 5 g of air-dried soil or compost sample (particle diameter<0.25 mm) was added into 30 mL of distilled water to obtain a mixture, and the mixture was shaken at 70° C. for 1 h, centrifuged at 3500 r/min and 40° C. for 15 min, and then the supernatant was filtered into a conical flask with a filter paper, and 30 mL of the prepared solution (0.1 mol/L NaOH and 0.1 mol/L $Na_4P_2O_7$, pH=13) was added, and the above steps of shaking, centrifuging and filtering were repeated, and the solution obtained after filtering was total alkali extracted humus. The total alkali extracted humus was acidified with 0.5 M $H_2SO_4$ at 65° C. for 1.5 h, and then placed overnight at 25° C. to precipitate a black floc; the floc was filtered out to obtain humic acid, and the filtrate was fulvic acid, and the concentrations of humic acid and fulvic acid were measured and calculated by organic carbon analyzer, and their contents were obtained by multiplying their concentrations by dilution multiple.

The content of humic acid or fulvic acid $$(g/kg) = \frac{K \times N \times 10^3}{M}$$

In which: K—the value measured by organic carbon analyzer

N—dilution multiple

M—the mass of soil or compost

Test method of the release amount of $CO_2$ in the soil culture: the pure biodegradable polymer or composite material system of biodegradable polymer and materials that slowly release nutrient nitrogen or nutrients nitrogen and phosphorus was uniformly mixed with soil in a culture bottle in a mass ratio of its carbon content to the soil quality of 1:60, and the soil without added material was used as a blank control (CK). The humidity of the soils was kept at 40%, and the soils were sealed and cultivated in the dark in an incubator at 25° C., and the gas was collected with an atmospheric sampler on the 15th, 45th, 105th and 165th day, the $CO_2$ concentration was measured with a gas chromatograph, and the mass of carbon in $CO_2$ was calculated.

Test method of the release amount of $CO_2$ in the compost culture: the pure biodegradable polymer or composite material system of biodegradable polymer and materials that slowly release nutrient nitrogen or nutrients nitrogen and phosphorus was uniformly mixed with the raw composting material composed of cow dung and corn straw in a mass ratio of 1:4 in a culture bottle in a mass ratio of its carbon content to the compost quality of 1:60, and the compost without added material was used as a blank control (CK); the humidity of the system was kept at 40%, and the system was sealed and cultivated in the dark in an incubator at a constant temperature of 58° C., and the gas was collected with an atmospheric sampler on the 30th, 60th, 90th and 120th day, the $CO_2$ concentration was measured with a gas chromatograph, and the mass of carbon in $CO_2$ was calculated.

The mass of carbon in $CO_2$ $$(g) = \frac{K \times 500 \times 12}{1 \times 10^9 \times 22.4}$$

In which: K—the value measured by gas chromatography
500—the volume of the culture bottle
12—the molar mass of carbon
22.4—the molar volume of gas In the following examples, the amount of carbon in $CO_2$ incrementally released=the amount of carbon in $CO_2$ released from the material treatment–the amount of carbon in $CO_2$ released from the blank treatment.

The amount of the increased humus carbon=the amount of the humus carbon after culture–the amount of the original soil humus carbon The amount of carbon released by biodegradation includes the amount of carbon in $CO_2$ incrementally released and the amount of the increased humus carbon.

In the present invention, the treatment refers to adding a pure biodegradable polymer or a composite material system of biodegradable polymer and materials that slowly release nutrient nitrogen or nutrients nitrogen and phosphorus into the soil or a compost raw material, blank refers to soil or compost without any added material, original refers to the soil or compost before culture, and the amount of carbon released by biodegradation refers to the amount of carbon released by the degradation of a pure biodegradable polymer or a composite material system of biodegradable polymer and materials that slowly release nutrient nitrogen or nutrients nitrogen and phosphorus.

Example 1

The biodegradable polymer PVA and urea-formaldehyde (UF) powder were uniformly mixed in a mass ratio of 2.91:1 to obtain a mixture. Then the mixture was extruded by an extruder and pelleted to obtain a simple physical blending system $[PVA+UF]_{C:N=5:1}$ of biodegradable polymer PVA and UF which slowly released nutrient nitrogen.

PVA and $[PVA+UF]_{C:N=5:1}$ were added to the soil respectively in a mass ratio of their respective carbon content to the soil quality of 1:60, wherein most of PVA and [PVA+UF]$_{C:N=5:1}$ were directly and uniformly mixed with the soil, respectively, and the rest were put into nylon mesh bags respectively and then buried in the soil for calculating the weight loss of materials. The humidity of the soils was kept at 40%, and the soils were sealed and cultivated in the dark in an incubator at 25° C. On the 15th, 45th, 105th, and 165th day, the FA contents of the soils treated with [PVA+UF]$_{C:N=5:1}$ were 1.77 g/kg, 1.93 g/kg, 1.88 g/kg, and 1.85 g/kg, respectively, which were increased by 3.08%, 7.57%, 8.93%, and 13.19% respectively compared with that of the soil treated with PVA under the same conditions; the HA contents of the soil treated with [PVA+UF]$_{C:N=5:1}$ were 3.98 g/kg, 4.73 g/kg, 5.11 g/kg and 6.01 g/kg, respectively, which were increased by 4.80%, 15.26%, 11.79% and 25.23%, respectively, compared with that of the soil treated with PVA under the same conditions. On the 165th day, the amount of carbon in $CO_2$ incrementally released/the amount of carbon released by biodegradation of the soil treated with [PVA+UF]$_{C:N=5:1}$ was 1.10%, which was increased by 7.53% compared with that of the soil treated with PVA under the same conditions; the amount of increased humus carbon/the amount of carbon released by biodegradation of the soil treated with [PVA+UF]$_{C:N=5:1}$ was 42.93%, which was increased by 29.31% compared with that of the soil treated with PVA under the same conditions; and the amount of increased humus carbon/the amount of carbon in $CO_2$ incrementally released of the soil treated with [PVA+UF]$_{C:N=5:1}$ was 1.10 times that of the soil treated with PVA under the same conditions.

PVA and [PVA+UF]$_{C:N=5:1}$ were added to the raw composting material composed of cow dung and corn straw in a mass ratio of 1:4, respectively, in a mass ratio of their respective carbon content to the raw composting material quality of 1:60, wherein most of PVA and [PVA+UF]$_{C:N=5:1}$ were directly and uniformly mixed with the raw composting material respectively, and the rest were put into nylon mesh bags respectively and then buried in the compost. The humidity of the systems was kept at 40%, and the systems were sealed and cultivated in the dark in an incubator at 58° C. On the 30th day, 60th day, 90th day and 120th day, the FA contents of the compost treated with [PVA+UF]$_{C:N=5:1}$ were 11.07 g/kg, 12.12 g/kg, 12.87 g/kg and 12.98 g/kg respectively, which were increased by 6.43%, 5.87%, 7.04% and 6.77% respectively compared with that of the compost treated with PVA under the same conditions; the HA contents of the compost treated with [PVA+UF]$_{C:N=5:1}$ were 38.85 g/kg, 43.66 g/kg, 46.87 g/kg and 48.13 g/kg respectively, which were increased by 10.25%, 10.18%, 12.18% and 13.27% respectively compared with that of the compost treated with PVA under the same conditions. On the 120th day, the amount of carbon in $CO_2$ incrementally released/the amount of carbon released by biodegradation for the compost treated with [PVA+UF]$_{C:N=5:1}$ was 2.49%, which was increased by 2.89% compared with that of the compost treated with PVA under the same conditions; the amount of increased humus carbon/the amount of carbon released by biodegradation of the compost treated with [PVA+UF]$_{C:N=5:1}$ was 236.45%, which was increased by 20.61% compared with that of the compost treated with PVA under the same conditions; and the amount of increased humus carbon/the amount of carbon in $CO_2$ released for the compost treated with [PVA+UF]$_{C:N=5:1}$ was 1.17 times that for the compost treated with PVA under the same conditions.

Example 2

The biodegradable polymer PBS and methylolurea (MU) powder, which was a reaction precursor of UF, were uniformly mixed in a mass ratio of 7:3 to obtain a mixture. Then the mixture was extruded by an extruder and pelleted. The added reaction precursor MU was subjected to melt polycondensation reaction in the barrel of the extruder to generate UF, thereby obtaining the composite material system [PBS/UF]$_{C:N=5.37:1}$ formed from the biodegradable polymer PBS and UF that can slowly release nutrient nitrogen by hydrogen bonds interaction.

PBS and [PBS/UF]$_{C:N=5.37:1}$ were applied into the soil in pots respectively in a mass ratio of their respective carbon content to the soil quality of 1:10900, wherein most of PBS and [PBS/UF]$_{C:N=5.37:1}$ were directly and uniformly mixed with the soil respectively, and the rest were put into nylon mesh bags respectively and then buried in the soil. After the surface soils were paved, the pots were watered with tap water, and then tomato seedlings were transplanted therein. On the 10th day, 40th day, 70th day and 100th day, the FA contents of the potting soil treated with $[PBS/UF]_{C:N=5.37:1}$ were 2.07 g/kg, 2.07 g/kg, 2.23 g/kg and 2.06 g/kg respectively, which were increased by 11.63%, 17.22%, 5.08% and 7.56% respectively compared with that of the potting soil treated with PBS under the same conditions; and the HA contents of the potting soil treated with $[PBS/UF]_{C:N=5.37:1}$ were 4.73 g/kg, 4.35 g/kg, 4.87 g/kg and 4.42 g/kg respectively, which were increased by 26.64%, 29.55%, 12.17% and 13.71% respectively compared with that of the potting soil treated with PBS under the same conditions.

Examples 3 and 4

The biodegradable polymer PVA and MU powder, which was a reaction precursor of UF, were uniformly mixed respectively in a mass ratio of 1.70:1 and 5.72:1 to obtain mixtures. Then the mixtures were extruded by an extruder and pelleted to obtain composite material systems $[PVA/UF]_{C:N=5:1}$ and $[PVA/UF]_{C:N=15:1}$ formed from the biodegradable polymer PBS and UF that can slowly release nutrient nitrogen by hydrogen bonds interaction.

PVA, $[PVA/UF]_{C:N=5:1}$, $[PVA/UF]_{C:N=15:1}$ were added to the soil respectively in a mass ratio of their respective carbon content to the soil quality of 1:60, wherein most of PVA, $[PVA/UF]_{C:N=5:1}$, $[PVA/UF]_{C:N=15:1}$ were directly and uniformly mixed with the soil, and the rest were put into nylon mesh bags respectively and then buried in the soil. The humidity of the soils was kept at 40%, and the soils were sealed and cultivated in the dark in an incubator at 25° C. On the 15th day, 45th day, 105th day and 165th day, the FA contents of the soil treated with $[PVA/UF]_{C:N=5:1}$ were 1.81 g/kg, 2.00 g/kg, 1.95 g/kg and 1.93 g/kg respectively, which were increased by 5.06%, 11.20%, 13.44% and 18.09% respectively compared with that of the soil treated with PVA under the same conditions; the FA contents of the soil treated with $[PVA/UF]_{C:N=15:1}$ were 1.89 g/kg, 2.13 g/kg, 2.11 g/kg and 1.99 g/kg respectively, which were increased by 9.78%, 18.67%, 22.65% and 21.76% respectively compared with that of the soil treated with PVA under the same conditions; the HA contents of the soil treated with $[PVA/UF]_{C:N=5:1}$ were 3.91 g/kg, 4.71 g/kg, 5.39 g/kg and 6.55 g/kg respectively, which were increased by 2.81%, 14.80%, 18.04% and 36.62% respectively compared with that of the soil treated with PVA under the same conditions; and the HA contents of the soil treated with $[PVA/UF]_{C:N=15:1}$ were 4.47 g/kg, 5.30 g/kg, 6.08 g/kg and 6.69 g/kg respectively, which were increased by 17.61%, 29.17%, 33.11% and 39.32% respectively compared with that of the soil treated with PVA under the same conditions. On the 165th day, the amount of carbon in $CO_2$ incrementally released/the amount of carbon released by biodegradation of the soil treated with $[PVA/UF]_{C:N=5:1}$ and $[PVA/UF]_{C:N=15:1}$ were 1.13% and 1.11% respectively, which were increased by 21.51% and 19.35% respectively compared with that of the soil treated with PVA under the same conditions, and the amount of increased humus carbon/the amount of carbon released by biodegradation for the soil treated with $[PVA/UF]_{C:N=5:1}$ and $[PVA/UF]_{C:N=15:1}$ were 42.49% and 45.63% respectively, which were increased by 27.98% and 37.44% respectively compared with that of the soil treated with PVA under the same conditions, and the amount of increased humus carbon/the amount of carbon in $CO_2$ incrementally released for the soil treated with $[PVA/UF]_{C:N=5:1}$ and $[PVA/UF]_{C:N=15:1}$ were 1.05 and 1.15 times that of the soil treated with PVA under the same conditions.

PVA, $[PVA/UF]_{C:N=5:1}$, $[PVA/UF]_{C:N=15:1}$ were added to the raw composting material composed of cow dung and corn straw in a mass ratio of 1:4, respectively, in a mass ratio of their respective carbon content to the compost quality of 1:60, wherein most of PVA, $[PVA/UF]_{C:N=5:1}$ or $[PVA/UF]_{C:N=15:1}$ were directly and uniformly mixed with the raw composting material, and the rest were put into nylon mesh bags respectively and then buried in the compost. The humidity of the systems was kept at 40%, and the systems were sealed and cultivated in the dark in an incubator at 58° C. On the 30th day, 60th day, 90th day and 120th day, the FA contents of the compost treated with $[PVA/UF]_{C:N=5:1}$ were 11.79 g/kg, 12.90 g/kg, 13.05 g/kg and 13.51 g/kg, respectively, which were increased by 13.42%, 12.48%, 8.53% and 11.12%, respectively, compared with that of the compost treated with PVA under the same conditions; the FA contents of the compost treated with $[PVA/UF]_{C:N=15:1}$ were 12.27 g/kg, 13.55 g/kg, 13.73 g/kg and 12.05 g/kg, respectively, which were increased by 17.98%, 18.14%, 14.26% and 15.62%, respectively, compared with that of the compost treated with PVA under the same conditions; the HA contents of the compost treated with $[PVA/UF]_{C:N=5:1}$ were 42.97 g/kg, 49.79 g/kg, 50.87 g/kg and 52.87 g/kg, which were increased by 21.95%, 25.65%, 21.75% and 24.44%, respectively, compared with that of the compost treated with PVA under the same conditions; the HA contents of the compost treated with $[PVA/UF]_{C:N=15:1}$ were 50.29 g/kg, 57.34 g/kg, 58.83 g/kg and 60.87 g/kg, which were increased by 42.72%, 44.70%, 40.80% and 43.26%, respectively, compared with that of the compost treated with PVA under the same conditions. On the 120th day, the amount of carbon in $CO_2$ incrementally released/the amount of carbon released by biodegradation for the compost treated with $[PVA/UF]_{C:N=5:1}$ and $[PVA/UF]_{C:N=15:1}$ were 3.37% and 3%, respectively, which were increased by 39.26% and 23.97%, respectively, compared with that of the compost treated with PVA under the same conditions, and the amount of increased humus carbon/the amount of carbon released by biodegradation for the compost treated with $[PVA/UF]_{C:N=5:1}$ and $[PVA/UF]_{C:N=15:1}$ were 282.92% and 353.10%, respectively, which were increased by 44.31% and 80.11%, respectively, compared with that of the compost treated with PVA under the same conditions, and the amount of increased humus carbon/the amount of carbon in $CO_2$ incrementally released for the compost treated with $[PVA/UF]_{C:N=N=5:1}$ and $[PVA/UF]_{C:N=15:1}$ were 1.04 and 1.45 times that of the compost treated with PVA under the same conditions.

The present invention further provides a comparative data table of the above examples, wherein Table 1 lists the thermal decomposition temperature $(T_{5\%})$ in the thermal stability parameters of UF, PVA, $[PVA+UF]_{C:N=5:1}$, $[PVA/UF]_{C:N=5:1}$ and $[PVA/UF]_{C:N=15:1}$ when the thermal weight losses of all samples are 5%.

TABLE 1

| treatment | $T_{5\%}$ (° C.) | weight loss rate (%) |
|---|---|---|
| PVA | 253.35 | 5.46 |
| $[PVA + UF]_{C:N=5:1}$ | 221.54 | 5.07 |
| $[PVA/UF]_{C:N=5:1}$ | 220.10 | 4.74 |
| $[PVA/UF]_{C:N=15:1}$ | 225.62 | 4.82 |
| UF | 192.72 | 4.22 |

Table 2 shows the comparison of the melting temperature of PVA, $[\text{PVA}+\text{UF}]_{C:N=5:1}$, $[\text{PVA/UF}]_{C:N=5:1}$ and $[\text{PVA/UF}]_{C:N=15:1}$.

TABLE 2

| treatment | melting temperature (° C.) |
|---|---|
| PVA | 224.56 |
| $[\text{PVA} + \text{UF}]_{C:N=5:1}$ | 197.51 |
| $[\text{PVA/UF}]_{C:N=5:1}$ | 192.25 |
| $[\text{PVA/UF}]_{C:N=15:1}$ | 198.83 |

Table 3 shows the thermal decomposition temperature ($T_{5\%}$) in the thermal stability parameters of UF, PBS, $[\text{PBS}+\text{UF}]_{C:N=5.37:1}$ and $[\text{PBS/UF}]_{C:N=5.37:1}$ when the thermal weight losses of all samples are 5%.

TABLE 3

| treatment | $T_{5\%}$ (° C.) | weight loss rate (%) |
|---|---|---|
| PBS | 367.44 | 1.19 |
| $[\text{PBS} + \text{UF}]_{C:N=5.37:1}$ | 272.61 | 4.15 |
| $[\text{PBS/UF}]_{C:N=5.37:1}$ | 271.45 | 3.12 |
| UF | 192.72 | 4.22 |

Table 4 shows the amount of increased humus carbon/the amount of carbon in $CO_2$ incrementally released of the soil in which each material is cultured for 165 days.

TABLE 4

| | PVA | $[\text{PVA} + \text{UF}]_{C:N=5:1}$ | $[\text{PVA/UF}]_{C:N=5:1}$ | $[\text{PVA/UF}]_{C:N=15:1}$ |
|---|---|---|---|---|
| the amount of carbon in the increased humus/the amount of carbon in $CO_2$ incrementally released (%) | 35.70 | 39.38 | 37.60 | 41.11 |

Table 5 shows the amount of increased humus carbon/the amount of carbon in $CO_2$ incrementally released of the compost treated with each material for 120 days.

TABLE 5

| | PVA | $[\text{PVA} + \text{UF}]_{C:N=5:1}$ | $[\text{PVA/UF}]_{C:N=5:1}$ | $[\text{PVA/UF}]_{C:N=15:1}$ |
|---|---|---|---|---|
| the amount of carbon in the increased humus/the amount of carbon in $CO_2$ incrementally released (%) | 81.01 | 94.96 | 83.95 | 117.70 |

Table 4 and Table 5 show that, in the soil culture and compost, the amount of increased humus carbon/the amount of carbon in $CO_2$ incrementally released of all the composite material systems of biodegradable polymers and materials that slowly release nutrient nitrogen are all higher than that of pure biodegradable polymers. Compared with the amount of increased humus carbon/the amount of carbon in $CO_2$ incrementally released of the soil treated with PVA, the amount of increased humus carbon/the amount of carbon in $CO_2$ incrementally released of the soil treated with $[\text{PVA}+\text{UF}]_{C:N=5:1}$, $[\text{PVA/UF}]_{C:N=5:1}$ and $[\text{PVA/UF}]_{C:N=15:1}$ are increased by 10.25%, 5.29% and 15.06%, respectively, after degradation in the soil for 165 days; and the amount of increased humus carbon/the amount of carbon in $CO_2$ incrementally released of the compost treated with $[\text{PVA}+\text{UF}]_{C:N=5:1}$, $[\text{PVA/UF}]_{C:N=5:1}$ and $[\text{PVA/UF}]_{C:N=15:1}$ are increased by 17.21%, 3.63% and 45.27%, respectively, after degradation in the compost for 165 days.

Table 6 shows the comparison of the contents of HA and FA after each material is applied into the potting soil, respectively, in a mass ratio of their respective carbon to the soil quality of 1:10900 and mixed with the potting soil, and the soils are treated for 100 days after the tomato seedlings are transplanted therein.

TABLE 6

| material | FA (g/kg) | HA (g/kg) |
|---|---|---|
| PBS | 1.88 | 3.88 |
| $[\text{PBS/UF}]_{C:N=5.37:1}$ | 2.06 | 4.42 |
| UF | 1.92 | 4.30 |

It can be seen from the table that in the pot experiment, the contents of FA and HA of the soil treated with the composite material systems of biodegradable polymers and materials that slowly release nutrient nitrogen are all higher than those of pure biodegradable polymers. Compared with the contents of FA and HA of the potting soil treated with PBS and UF, the contents of FA and HA the soil treated with $[\text{PBS/UF}]_{C:N=5.37:1}$ are increased by 9.57% and 7.29%, 13.92% and 2.79% respectively on the 100th day of the pot experiment.

The above examples are only specific embodiments of the present invention, but the protection scope of the present invention is not limited to this. Any person skilled in the art can easily think of changes or replacements within the technical scope disclosed by the present invention. These changes or replacements should fall within the protection scope of the present invention. Therefore, the protection scope of the present invention should be determined by the protection scope of the claims.

The invention claimed is:

1. A method for converting biodegradable polymers into humus, characterized in that a composite material system is formed from the biodegradable polymers and materials that release nutrient nitrogen or nutrients nitrogen and phosphorus, in which the mass ratio of carbon to nitrogen in the composite material system is (1-35):1, the biodegradable polymers are polyvinyl alcohol;

wherein the method is for promoting the conversion of biodegradable polymers into compost humus;

the composite material system is added into raw composting materials to obtain a mixture, wherein a mass ratio of carbon in the composite material system to a mass of raw composting materials is 1:(60-10900); and the raw composting materials consist of a cow dung and a corn straw in a mass ratio of 1:4;

wherein the mixture formed by the composite material system and the raw composting materials is incubated at a humidity of 40% and a temperature of 58° C. in the dark for 30-120 days.

2. The method according to claim 1, characterized in that, in the composite material system, the biodegradable polymers and the materials that release nutrient nitrogen or nutrients nitrogen and phosphorus are compounded by physically blending the biodegradable polymers and the materials that slowly release nutrient nitrogen or nutrients nitrogen and phosphorus or by hydrogen bonds interaction among functional groups of each of components of the composite material system.

3. The method according to claim 2, characterized in that the materials that can release nutrient nitrogen or nutrients nitrogen and phosphorus are selected from at least one from the group consisting of slow-release fertilizers, controlled-release fertilizers, polyurea, polyacrylamide, polyaspartic acid, protein, melamine copolymer resin, phosphates polymer and compounds thereof.

4. The method according to claim 3, characterized in that the slow-release fertilizers comprise urea-formaldehyde or its derivatives thereof.

5. The method according to claim 2, characterized in that the step of physically blending the biodegradable polymers and the materials that release nutrient nitrogen or nutrients nitrogen and phosphorus comprises the steps of uniformly mixing the biodegradable polymers with the materials that can release nutrient nitrogen or nutrients nitrogen and phosphorus, and then extruding the uniformly mixed material system by an extruder and pelleting the same to obtain the composite material system.

6. The method according to claim 4, characterized in that the step of compounding the biodegradable polymers and urea-formaldehyde by hydrogen bonds interaction among functional groups of each of components of the composite material system comprises the steps of:

(1) preparation of a methylolurea powder: adding calculated amounts of formaldehyde and urea into a reactor respectively to obtain a reaction system, adjusting the pH of the reaction system, and reacting the same at a set temperature followed by pouring the reaction solution into a beaker and sealing it, freezing it in a refrigerator, and then extracting and filtering out the remaining liquid to obtain a sample, and finally drying the sample in a vacuum oven and then pulverizing it to obtain a methylolurea powder; and (2) uniformly mixing the biodegradable polymers with the methylolurea powder, which is a precursor of urea-formaldehyde, prepared in step (1), then extruding the uniformly mixed material system by an extruder and pelleting the same, and subjecting the added methylolurea powder, which is a reaction precursor of urea-formaldehyde, to melt polycondensation reaction in a barrel of the extruder to obtain the composite material system formed from the biodegradable polymers and urea-formaldehyde by the hydrogen bonds interaction among functional groups of each of components of the composite material system; or the step of compounding the biodegradable polymers and derivatives of urea-formaldehyde by hydrogen bonds interaction among functional groups of each of components of the composite material system comprises the steps of:

(I) preparation of methylolurea powder: adding calculated amounts of formaldehyde and urea into a reactor respectively to obtain a reaction system, adjusting the pH of the reaction system, and reacting the same at a set temperature followed by pouring the reaction solution into a beaker and sealing it, freezing it in a refrigerator, and then extracting and filtering out the remaining liquid to obtain a sample, and finally drying the sample in a vacuum oven and then pulverizing it to obtain the methylolurea powder; and (II) uniformly mixing the biodegradable polymers with the methylolurea powder, which is a precursor of urea-formaldehyde, prepared in step (I) and phosphate, then extruding the uniformly mixed material system by an extruder and pelleting the same, and subjecting the added methylolurea powder, which is a reaction precursor of urea-formaldehyde, to melt polycondensation reaction in a barrel of the extruder to obtain the composite material system formed from the biodegradable polymers and derivatives of urea-formaldehyde by the hydrogen bonds interaction among functional groups of each of components of the composite material system.

* * * * *